United States Patent Office 3,329,486
Patented July 4, 1967

3,329,486
COMPOSITION AND DEVICE FOR TESTING FOR CHLORIDE, BROMIDE, IODIDE, CYANIDE, AND THIOCYANATE
Chauncey Orvis Rupe, Elkhart, Ind., assignor to Miles Laboratories, Inc., Elkhart, Ind., a corporation of Indiana
No Drawing. Filed Sept. 10, 1965, Ser. No. 486,526
13 Claims. (Cl. 23—253)

This application is a continuation-in-part of copending application Ser. No. 295,218, filed July 15, 1963, now abandoned.

This invention relates to a test for chlorides, bromides, iodides, cyanides and thiocyanates in aqueous solutions. In one of its particular aspects it relates to improved compositions useful in the qualitative detection and quantitative determination of such ionic constituents, particularly chlorides in biological fluids. In a more particular aspect, this invention is concerned with stabilized test reagent compositions which are incorporated with bibulous carriers.

The regulation of the concentrations of salts in the tissue fluids of the body is important in connection with the maintenance of a normal range of osmotic pressure, the relation between sodium, potassium, calcium and other cation concentrations, and the acid-base equilibrium. In the blood, chlorides are the chief contributors to the creation and maintenance of osmotic pressure. The concentrations of chlorides in the blood, under normal circumstances, is remarkably constant whereas, in the urine, the concentration may vary over a considerable range dependent in part upon the diet of the individual.

The presence of excess chlorides or the lack thereof in the blood, or the lack of chlorides in the urine is well recognized as extremely significant in the detection of abnormal conditions in the body. Lack of chlorides in the urine may be indicative of, for example, nephritis, grave sodium chloride deficiency syndromes, intestinal obstructions, etc. Increases and decreases in the chloride content of blood plasma may be indicative of extreme alkalemia or acidemia, which conditions are indicative of various body abnormalities. It is readily understood that the detection of excess amounts or lack of chlorides in the body fluids is extremely important to the healing arts. In addition to the detection of chloride in biological fluids it is also of considerable importance that such fluids be tested for the various other ionic constitutents noted hereinabove.

Industrial fluids must likewise be routinely tested for the presence and amount of such commonplace ions. An example of the applicability of the present invention to industrial fluids would be the detection of cyanide ion in electroplating baths. Surface and ground waters must also often be tested for the presence of chlorides, iodides, and so forth.

Thus it is considered desirable to provide a simple, economical and rapid test for the qualitative and quantitative determination of chlorides, iodides, bromides, cyanides and thiocyanates. As used hereinafter, the term "detection" or "detecting" means the quantitative determination as well as the qualitative testing for the noted constituents. The known methods for the detection of the aforenoted ionic constituents generally require complex laboratory equipment and skilled technicians to produce results which are often needed immediately for diagnosis or quality control purposes.

In this same respect, from a commercial point of view, test compositions in the form of bibulous strips or sticks are highly preferred for the reason that such provide the technician with a simple "dip and read" test. Such dip and read tests provide many advantages over prior known reagent methods and compositions from the standpoint of ease and simplicity of test procedure, absence of cumbersome equipment, ease of disposal of test devices, rapidity of test procedures, to mention only a few. Such bibulous materials will be further disclosed hereinafter.

Moreover, these test compositions, either alone or incorporated with a bibulous carrier, must be stable. That is, they must have a shelf life which is amenable to the commercial nature of the product.

It is therefore an object of this invention to provide improved test compositions and methods for the detection of chlorides, iodides, bromides, cyanides, and thiocyanates, which are sensitive, simple in operation, stable on storage, economical to manufacture and provide prompt and accurate results. It is an additional object to provide an improved test composition for the detection and the quantitative determination of chlorides in aqueous solutions which may be prepared in "strip" or "stick" form.

It is a further object of the present invention to provide a convenient and effective method for the qualitative and quantitative determination of such ionic constituents in liquids which can be performed by persons without specific chemical or biochemical training. For example, the estimation of chloride concentration in urine, blood, etc., may be safely conducted by the nursing staff of a hospital.

In accordance with this invention, test compositions are provided, together with a method of preparing such compositions in strip or stick form, said compositions and method overcoming the disadvantages of prior known compositions and methods.

More specifically, test compositions and devices have been discovered for detecting chlorides, iodides, bromides, cyanides and thiocyanates which are sensitive, highly stable and resistant to deteriorative effects of moisture. Hence, such test devices may be stored for long periods of time before using. In addition, the method of this invention provides a simple, one-step, procedure involving impregnating a bibulous carrier with a novel formulation comprising a divalent copper salt, a diaminodiphenyl compound and a buffer.

It is known in the prior art to test for elemental chlorine utilizing various diaminodiphenyl compounds, for example, ortho-tolidine. Diaminodiphenyl compounds are oxidized by chlorine to give partially oxidized products known as meriquinones and more fully oxidized products known as holoquinones. In the presence of excess acid, the formation of the holoquinone is favored whether or not the amount of diaminodiphenyl compound is present in excess of the quantity which theoretically can be completely oxidized by the amount of chlorine present. This known method of testing utilizes the principle that, if the amount of diaminodiphenyl compounds be maintained constant throughout a series of tests and is gravimetrically greater than the amount of chlorine present in the quantity of chlorine-containing liquid which is, maintained at a pH of between 3.0 and 5.5, the particular color which is formed through the reaction will be dependent upon the quantity of chlorine present. In other words, the test utilizes the principle that the available chlorine oxidizes the reagent through successive stages under the prescribed pH conditions. Such known tests for free chlorine are, however, not adaptable to determinations of chloride ions.

It is also known in the prior art that cyanide ion may be detected by employing a copper salt-aromatic amine composition. Such compositions have, however, been found to be notoriously unstable. In fact, because of such instability, a method is disclosed in U.S. Patent No. 2,855,280 to P. W. McConnaughey whereby a copper salt and an aromatic amine are stored separately and combined immediately prior to use.

It has now been found that the aforenoted difficulties can be overcome and an extremely sensitive test composition produced by combining a copper salt, a diaminodiphenyl compound, a buffer capable of maintaining the composition within a prescribed pH range and various other adjuvants as will be disclosed hereinafter.

The compositions of this invention take advantage of the fact that divalent copper will not oxidize a diaminodiphenyl compound unless either a chloride, bromide, iodide, cyanide or thiocyanate ion is present. As such, the compositions of the present invention have utility, not only in the detection of chloride (Cl⊖) ions in aqueous solution, but also in the detection of bromide (Br⊖), iodide (I⊖), cyanide (CN⊖) or thiocyanate (SCN⊖) ions in aqueous solution. Apparently these ions cause a change in the oxidation potential in such a way as to effect oxidation of the diaminodiphenyl compound. It has been theorized that this reaction may be brought about by removing the cuprous ion as an insoluble chloride, bromide, iodide, cyanide or thiocyanate salt, or by complexing the cupric ion with the diaminodiphenyl compound. It has also been theorized that the diaminodiphenyl compound reacts with the cupric ion to form a compound in which the cupric ion is a part of the cation. The anion then reacts with the diaminodiphenyl-copper compound, splitting off the copper as an insoluble cuprous salt with the simultaneous oxidation of the diaminodiphenyl compound to a blue color.

Any divalent copper salt, that is, any cupric salt, may be used. However, water soluble cupric salts are preferred because of ease of formulation. Exemplary of the numerous cupric salts which may be used in the practice of the present invention are cupric sulfate, cupric chloride, cupric carbonate, cupric citrate, cupric hydroxide, cupric nitrate, cupric phosphate and cupric tartrate. For reasons of economy and availability cupric sulfate is the preferable cupric salt.

The present invention contemplates the use of any of the para-diaminodiphenyl compounds having the general formula

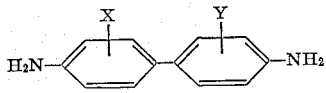

where X and Y represent monovalent radicals selected from the class consisting of hydrogen, alkyl, and alkoxy groups and may be the same or different. Exemplary of the many diaminodiphenyl compounds which are chromogenically responsive to the presence of chloride, bromide, iodide, cyanide and thiocyanate ions in the presence of the copper salts are benzidine, o-tolidine, o-dianisidine, various benzidine derivatives and the like. The chromogenically responsive material preferred for the compositions of this invention is o-tolidine.

It is important that the compositions of this invention be properly buffered. If the buffering is at too low or too high a pH, the bibulous carrier turns brown and loses sensitivity. While a wide range of pH may be used, for example about from pH 2.0 to pH 8.0, it has been found that the optimum pH is about from pH 4.5 to pH 5.0. Various types of buffers such as malonate, maleate, citrate, tartrate, gluconate, and the like, can be used. It has also been found that combining tris(hydroxymethyl)aminomethane, hereinafter referred to as tris, with acids such as glutamic acid may also be used as buffering system in the compositions of the present invention. Because all of these buffers will chelate with the cupric ion, the pH and the ratio of the cupric ion to buffer concentration is important. The concentration of the cupric ion and buffer must be so regulated as to afford a proper pH and buffering capacity while still providing sufficient cupric ion to participate in the color reaction.

Table 1 illustrates the point. The ratio of the number of milliliters of 1 M CuSO₄ solution used to the number of milliliters 1 M malonate-tris buffer, pH 4.5 is compared with the lowest concentration of NaCl detected.

TABLE 1

| Molar Ratio CuSO₄/Buffer | Lowest Concentration of NaCl Detected, Percent |
|---|---|
| 0.75:1 | 0.8 |
| 1.25:1 | 0.4 |
| 1.4:1 | 0.4 |
| 1.75:1 | 0.4 |
| 2.4:1 | 0.2 |

These data show an increasing sensitivity with an increasing molar ratio of cupric sulfate to buffer. The preferred molar ratio of cupric salt to buffer has been found to be from about 2:1 to about 2.5:1. The operable range of molar ratio of cupric salt to buffer has been found to be from 10:1 to 1:1.

Table 2 shows the effect of pH upon the reaction. The CuSO₄/buffer ratio was held at 2.4:1.

TABLE 2

| pH | Lowest Concentration of NaCl Detected, Percent |
|---|---|
| 3.6 | 0.8 |
| 4.0 | 0.8 |
| 4.1 | 0.4 |
| 4.7 | 0.2 |

These data show an increasing sensitivity with increasing pH. As pointed out above, the preferred pH range is about from pH 4.5 to pH 5.0.

In addition to utilizing glutamic acid with tris, it has been found that numerous other organic and inorganic acids may be utilized to form the buffer system of the present invention. Generally those weak monobasic and polybasic acids which have a pK (negative logarithm of the dissociation constant) of from about 2 up to about 12 are preferred in forming the present tris buffer salts. When a polybasic acid is utilized this pK range applies to the primary dissociation thereof. Exemplary of these acids are the monobasic acids such as gluconic acid, acetic acid and lactic acid, the dibasic acids such as malonic acid, phthalic acid, aspartic acid, maleic acid, malic acid, saccharic acid, succinic acid and tartaric acid, and the tribasic acids such as critic acid, aconitic acid, isocitric acid, ortho-boric acid and ortho-phosphoric acid.

In formulating the compositions of this invention it has also been found desirable to utilize an organic water soluble polymeric substance as a conveyor or thickening agent for the compositions. It is also believed that this polymeric substance contributes protective or stabilizing qualities to these compositions. In this regard, materials such as polyvinyl acetates and hydrolysis products thereof such as polyvinyl alcohols may be utilized. In utilizing these polyvinyl compounds it is understood that various hydrolysis stages of the acetate may be utilized which would result in a mixture of the acetate and alcohol. Other materials such as polyethylene glycols, polyvinylpyrrolidone, gelatin, bovine serum albumin, starch or sodium alginate may likewise be utilized in this regard.

Wetting agents or surface active agents may be used in the compositions of this invention to assure an even distribution of the ingredients upon the test sticks, and, after drying, a uniform wetting of the test stick when used. Various types of wetting agents may be used for this purpose including cationic, anionic and non-ionic varieties. Exemplary of the wetting agents which may be used are dioctyl sodium sulfosuccinate (Aerosol® OT) and polyoxyethylene sorbitan mono-oleate (Tween® 81). Wetting agents are not essential, but their use contributes desired elegance to sticks made from the compositions of this invention.

The bibulous carrier may be any material known to the art, for example, paper, porous wood, cotton, wool, synthetic fibers, or the like, so long as it is capable of holding the color responsive substance or substances and rapidly absorbs, or otherwise picks up a substantially constant amount of the liquid being analyzed upon momentary immersion therein. The carrier should be, of course, free of the ion or ions being measured. Alternatively, the color responsive material should be adjusted to compensate for the particular level of ions inherently present in the carrier. Because of its inexpensiveness and desirable absorptive characteristics, paper is ideally suited as a carrier. The method of this invention may be carried out either by immersing the indicator paper in the liquid to be tested or by applying a drop of the liquid (e.g., blood) to the paper and observing the color change of the ring formed around the drop.

In preparing the test compositions of the present invention the various ingredients may be varied over a wide range of proportions. However, it has been found that utilizing the following proportions produces a composition which is sensitive and stable.

TABLE 3

| Ingredient | Range Percent by weight |
| --- | --- |
| Copper Salt | 0.05 to 1.5. |
| Diaminodiphenyl Compound | 0.01 to 1.0. |
| Buffer—to pH of | 2.0 to 8.0. |
| Organic Polymeric Substance | 0 to 15. |
| Wetting Agent | 0 to 0.1. |

The following examples will illustrate the improved compositions of the present invention, the scope of the invention not, however, being limited to the specific details of these examples:

Example 1

A base solution of cupric sulfate ($CuSO_4 \cdot 5H_2O$) was prepared by dissolving 2.4 g. crystalline cupric sulfate in water and diluting to 100 ml. Three (3) ml. of the base cupric sulfate solution was mixed with 1 ml. of gluconate buffer, 1 M, pH 4.9, and 1 ml. of the resulting solution was then mixed with 10 ml. of a 20% solution of polyethylene glycol (Carbowax 6000 W) in water, and 5 ml. of a 1% solution of ortho-tolidine in ethanol. The solutions were thoroughly mixed, and strips of a bibulous filter paper were dipped into the solution and dried at 90–100° C. for eight minutes. The finished strips were slightly greenish-yellow and turned light blue when dipped into a 0.2% solution of sodium chloride.

Example 2

A solution was prepared comprising 2 ml. of the base cupric sulfate solution of Example 1, 10 ml. of a 20% solution of polyethylene glycol (Carbowax 6000 W) in water, 2 ml. water, 0.5 ml. malonate-tris buffer and 2 ml. of a 1% solution of ortho-tolidine free base in 95% ethanol. The malonate-tris buffer was prepared by bringing a 0.5 M solution of malonic acid to a pH of 6.0 by adding solid tris (hydroxymethyl) aminomethane. After mixing all of the aforementioned constituents of the test solution the pH of the test solution was brought to 4.7 by the further addition of solid tris (hydroxymethyl) aminomethane.

Strips of bibulous filter paper were dipped into the solution and dried in a tunnel at 90–100° C. The dried strips were light green and turned blue when dipped into 0.2% sodium chloride solution.

In actual use, an impregnated strip as described above is dipped into the liquid specimen to be tested and any color change observed. When contacted with aqueous solutions containing chloride ions, a test strip will undergo positive color changes. More specifically, test strips made according to Example 2, when contacted with solutions containing various concentrations of sodium chloride, produced the color reactions shown on Table 4 below.

TABLE 4

| NaCl percent | Color |
| --- | --- |
| 0 | Light green (no color change). |
| 0.1 | Trace blue. |
| 0.2 | Light blue. |
| 0.4 | Moderate blue. |
| 0.8 | Do. |
| 1.6 | Dark blue. |

Example 3

One (1) ml. of the base cupric sulfate solution of Example 1, 8 ml. of a 20% solution of polyvinyl alcohol in water, and 10 ml. of a 2% solution of ortho-tolidine in 95% ethanol were mixed. A bibulous filter paper strip was dipped into the solution and dried at 80° C. for eight minutes. The strip produced a blue color when dipped into a 1.6% sodium chloride solution.

Example 4

A composition was prepared by mixing the following solutions in the order presented:

|  | Ml. |
| --- | --- |
| Polyvinyl alcohol, 10% aqueous solution | 12.0 |
| Polyoxyethylene sorbitan mono-oleate 5% aqueous solution | 0.1 |
| Malonate-tris buffer, prepared as in Example 2 | 0.5 |
| o-Tolidine, 1% in ethanol | 4.0 |
| Cupric nitrate, 1.0 M aqueous solution | 2.0 |

Bibulous filter paper strips were dipped into the above solution and dried at 100° C. When contacted with urine containing about 0.5% by weight chloride, the strips turned a bright blue.

Example 5

A composition was prepared as in Example 4 with the exception that the cupric nitrate solution was replaced with a mixture of 1.0 ml. of a 1.0 M solution of cupric sulfate and 1.0 ml. of 1.0 M cupric nitrate. Bibulous filter paper strips were also prepared as in Example 3 and were found to be extremely sensitive when contacted with urine containing chloride ion.

Example 6

A composition was prepared as in Example 1 with the exception that a 1% solution of o-dianisidine was utilized in the place of the o-tolidine. The test strips prepared from this composition turned blue when contacted with a chloride containing solution.

Example 7

Bibulous strips were prepared as in Example 3 and stored in capped bottles at room temperature for a period of about 4 years. After this storage period the strips were contacted with a 0.2% by weight aqueous solution of sodium chloride. The strips turned a bright blue.

Example 8

The bibulous strips prepared and stored as in Examples 3 and 6 were contacted with separate 0.1% by weight aqueous solutions of sodium bromide, potassium iodide, sodium cyanide and potassium thiocyanate. In each instance, upon such contact, the strips turned a bright blue.

What is claimed is:

1. A composition for the detection of chloride, bromide, iodide, cyanide and thiocyanate ions in aqueous solution which comprises:
    a buffer effective to maintain the pH of the composition within a range of about 2.0 to 8.0;

a divalent copper salt, present in the composition in a molar ratio to the buffer of about from 10:1 to 1.1; and, a chromogenically responsive amount of a para-diaminodiphenyl compound having the formula

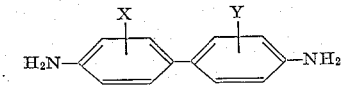

where X and Y are selected from the group consisting of hydrogen, alkyl, and alkoxy groups.

2. A composition as in claim 1 wherein the buffer is effective to maintain the pH within a range of from about 4.5 to 5.0.

3. A composition as in claim 1 wherein the para-diaminodiphenyl compound is o-tolidine.

4. A composition as in claim 1 wherein the copper salt is cupric sulfate.

5. A composition as in claim 1 wherein the copper salt and the buffer are present in a molar ratio of from about 2:1 to about 2.5:1.

6. A composition as in claim 1 which additionally comprises up to about 15% by weight of an organic water soluble polymeric substance selected from the group consisting of polyvinyl acetate, polyvinyl alcohol, polyethylene glycol, polyvinyl pyrrolidone, gelatin, bovine serum albumin, starch and sodium alginate.

7. A composition as in claim 6 wherein the organic water soluble polymeric substance is polyvinyl alcohol.

8. A composition as in claim 1 wherein the buffer is a salt of a weak acid and tris (hydroxymethyl) aminomethane.

9. A composition as in claim 8 werein the weak acid is malonic acid.

10. A test device for the detection of chloride, iodide, cyanide and thiocyanate ions in aqueous solution which comprises a bibulous carrier incorporated with a composition comprising:

a buffer effective to maintain the pH of the composition within a range of about 2.0 to 8.0;

a divalent copper salt, present in the composition in a molar ratio to the buffer of about from 10:1 to 1:1; and, a chromogenically responsive amount of a para-diaminodiphenyl compound having the formula

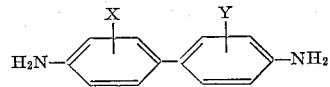

where X and Y are selected from the group consisting of hydrogen, alkyl, and alkoxy groups.

11. A test device as in claim 10 wherein the composition additionally comprises up to about 15% by weight of an organic water soluble polymeric substance selected from the group consisting of polyvinyl acetate, polyvinyl alcohol, polyethylene glycol, polyvinyl pyrrolidone, gelatin, bovine serum albumin, starch and sodium alginate.

12. A test device for the detection of chloride, bromide, iodide, cyanide and thiocyanate ions in aqueous solution which comprises a bibulous carrier impregnated with a composition comprising:

about from 0.05% to 1.5% by weight of cupric sulfate;

about from 0.01% to 1.0% by weight of o-tolidine, which together with the cupric sulfate is chromogenically responsive to the presence of said ions; and, a tris-malonate buffer which is effective to maintain the pH of the test device within a range of about from 2.0 to 8.0.

13. A test device as in claim 12 wherein the composition additionally comprises up to about 15% by weight of polyvinyl alcohol.

References Cited
UNITED STATES PATENTS

| | | | |
|---|---|---|---|
| 2,385,471 | 9/1945 | Scharer | 23—230 |
| 2,855,280 | 10/1958 | McConnaughey | 23—232 |
| 3,016,292 | 1/1962 | Bauer et al. | 23—253 |
| 3,069,330 | 12/1962 | Babson | 195—103.5 |

MORRIS O. WOLK, *Primary Examiner.*

Z. PAROCZAY, L. MEI, *Assistant Examiners.*